July 21, 1931.  A. C. EMERSON ET AL  1,815,401
AUTOMOBILE HEATER
Filed June 9, 1930  2 Sheets-Sheet 1
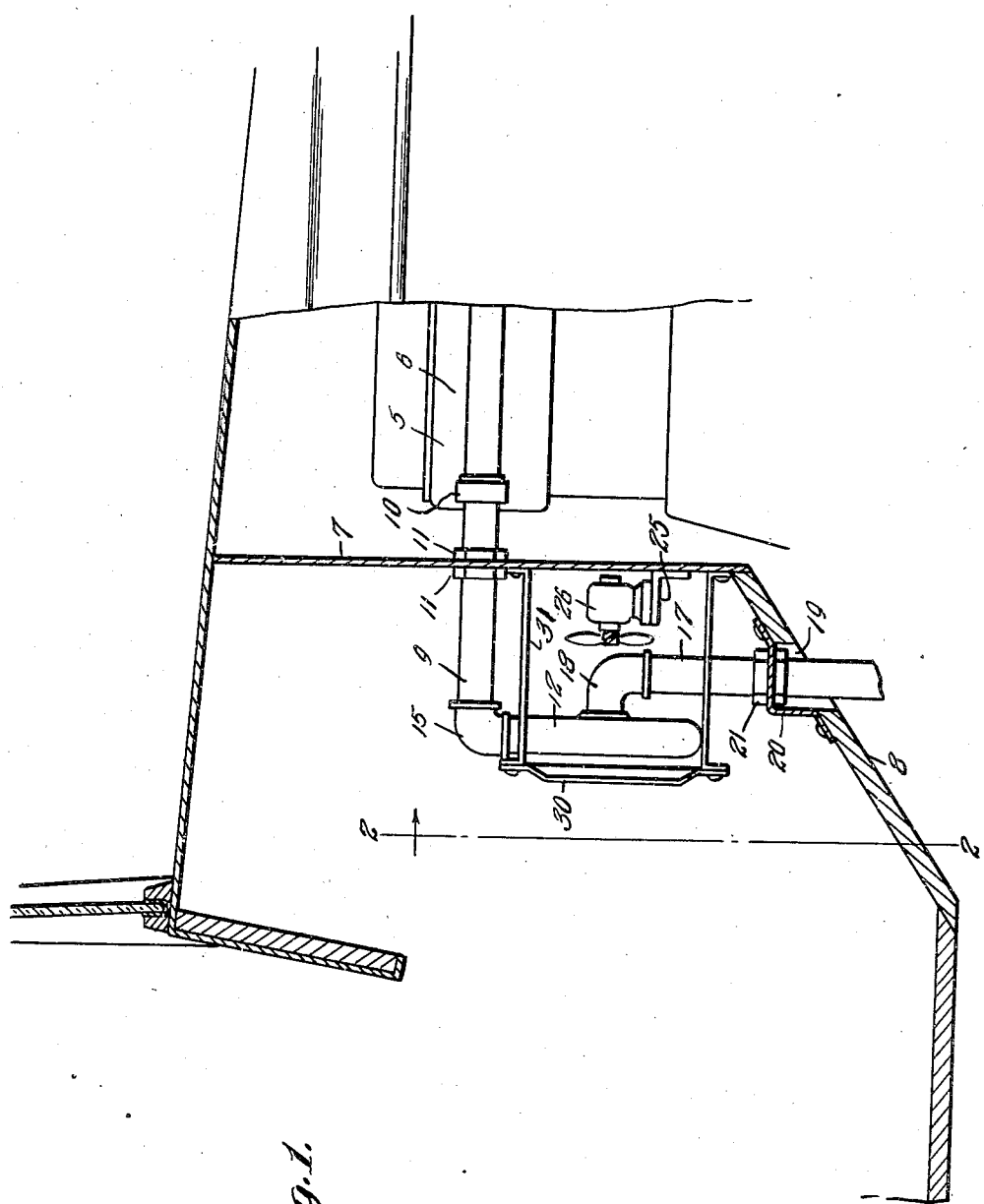
Inventors
A. C. Emerson
J. C. Crandall
By Clarence A. O'Brien
Attorney

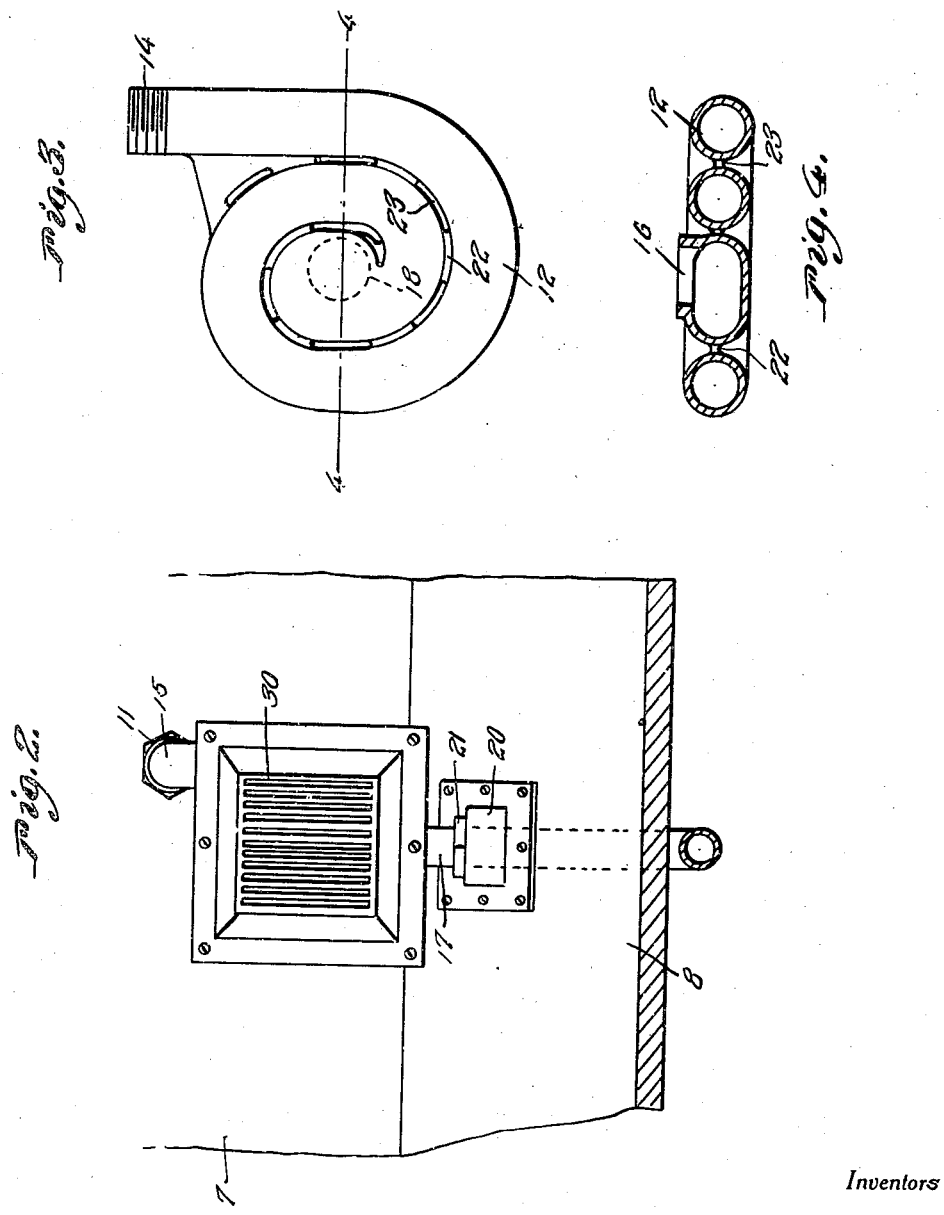

Patented July 21, 1931

1,815,401

UNITED STATES PATENT OFFICE

ARTHUR C. EMERSON AND IRVIN C. CRANDALL, OF SUPERIOR, WISCONSIN

AUTOMOBILE HEATER

Application filed June 9, 1930. Serial No. 459,962.

The present invention relates to an automobile heater and has for its prime object to provide a structure which may be conveniently mounted in the automobile for directing hot air into the passenger compartment.

Another very important object of the invention resides in the provision of an automobile heater of this nature which is simple in its construction, inexpensive to manufacture and install, thoroughly efficient and reliable in use and operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 1 is a longitudinal vertical sectional view through a portion of the automobile showing my heating apparatus in side elevation installed therein, Figure 2 is a sectional view taken substantially on the line 2—2 of Figure 1, Figure 3 is a detail view of the heating coil, and Figure 4 is a sectional view therethrough taken substantially on the line 4—4 of Figure 3.

Referring to the drawings in detail it will be seen that the numeral 5 denotes an automobile engine including the exhaust manifold 6. The numeral 7 denotes a dashboard and the numeral 8 a floor board. The pipe 9 is coupled as at 10 with the exhaust manifold 6 and extends through an opening in the dashboard 7 and has packing nuts 11 thereabout one to each side of the dashboard.

The numeral 12 denotes a coil pipe which is disposed in a vertical plane having the inlet 14 coupled by an elbow 15 with the pipe 9 and the outlet 16 which is at the approximate center of the coil coupled with a pipe 17 by an elbow 18. Pipe 17 extends down through an opening 19 in the floor board 8.

A plate 20 is disposed over the opening 19 and has an opening through which the pipe 17 extends, there being packing nuts 21 about the pipe 17 one to each side of the plate 20.

The coil 12 has its convolutes connected by a web 22 and slots 23 are formed in this web for the passage of air. On a shelf 25 attached to the dashboard 7 there is situated on electric fan 26 adapted to blow through the coil to direct the heated air into the passage or compartment of the automobile. A grating 30 is mounted immediately to the rear of the coil 12 by means of brackets 31 attached to the dashboard 7.

With this type of heater the exhaust gases direct from the manifold of the engine quickly and efficiently heat the coil 12 in a short space of time and the air is quickly driven to the compartments of the automobile by the fan. This gives a good circulation and distribution of the heated air in all parts of the automobile. The heating apparatus is safe from fumes and odors, is easy to install and is not likely to get out of order.

It is thought that the construction, utility and advantages of this invention will now be quite apparent to those skilled in this art without a more detailed description thereof.

The present embodiment of the invention has been disclosed in considerable detail merely for the purposes of exemplification since in actual practice it attains the features of advantage enumerated as desirable in the statement of the invention and the above description.

It is apparent that changes in the details of construction, and the combination and arrangement of parts may be resorted to without departing from the spirit or scope of the invention as hereinafter claimed or sacrificing any of its advantages.

Having thus described our invention, what we claim as new is:

In an automobile and in combination with the exhaust manifold, a pipe coil located in the front part of the body of the automobile and an extension pipe for the exhaust manifold having its front end connected with the rear end of the manifold and forming a continuation of the manifold, the rear end of said pipe being connected with the outer end of the coil, an exhaust pipe connected with the inner end of the coil whereby all the exhaust gases from the engine pass through the coil and a fan arranged in front of the coil for forcing air through the spaces between the coil.

In testimony whereof we affix our signatures.

ARTHUR C. EMERSON.
IRVIN C. CRANDALL.